UNITED STATES PATENT OFFICE.

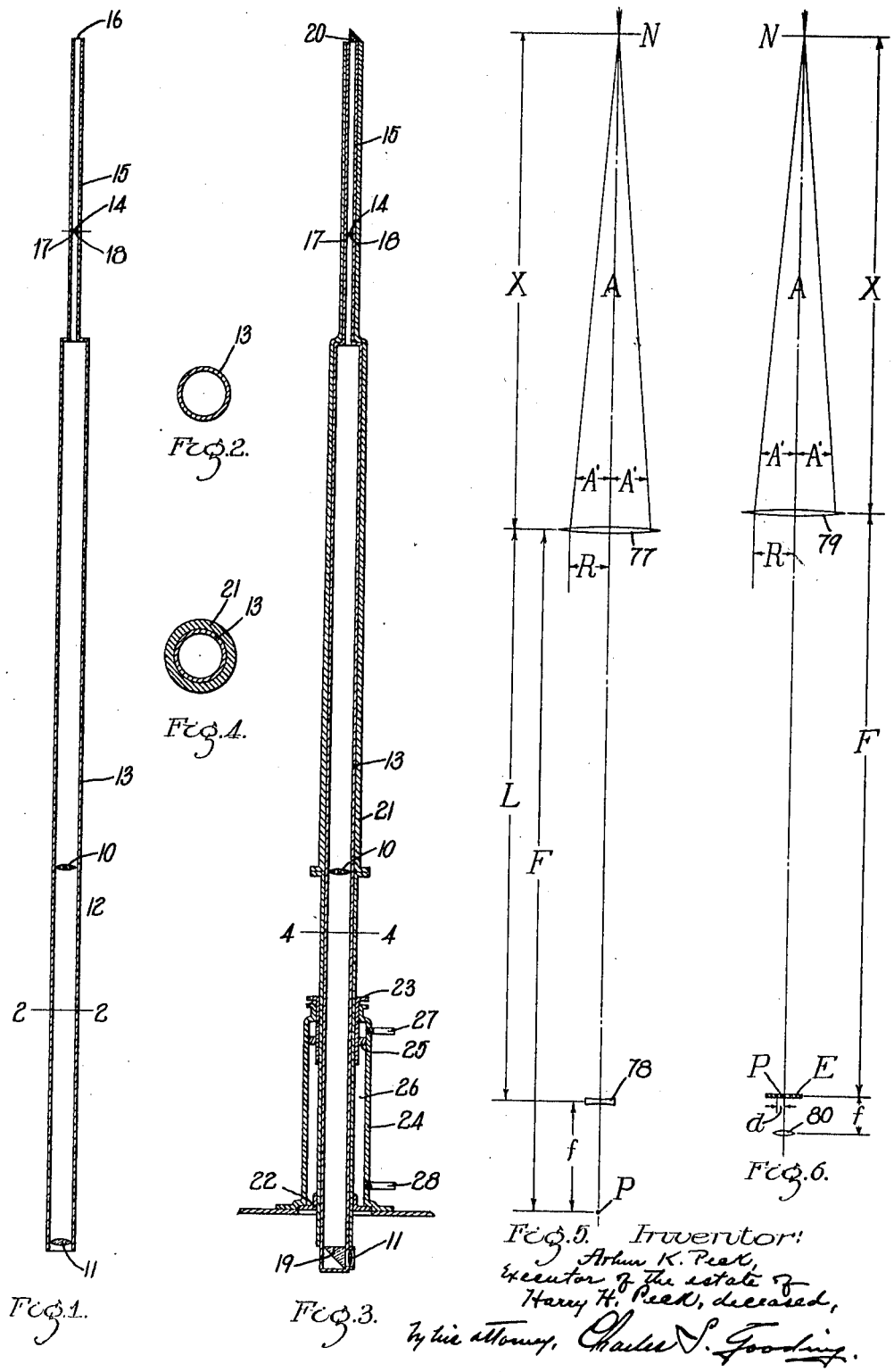

HARRY H. PECK, DECEASED, LATE OF CAMBRIDGE, MASSACHUSETTS, BY ARTHUR K. PECK, EXECUTOR, OF BOSTON, MASSACHUSETTS, ASSIGNOR, BY DIRECT AND MESNE ASSIGNMENTS, OF ONE-HALF TO FORE RIVER SHIPBUILDING CORPORATION, OF QUINCY, MASSACHUSETTS, THREE-EIGHTHS TO ARTHUR K. PECK, OF BOSTON, MASSACHUSETTS, AND ONE-EIGHTH TO NEWELL A. THOMPSON, JR.

OPTICAL INSTRUMENT.

1,314,480.  Specification of Letters Patent.  Patented Aug. 26, 1919.

Original application filed October 23, 1916, Serial No. 127,084. Divided and this application filed November 14, 1918. Serial No. 262,464.

*To all whom it may concern:*

Be it known that HARRY H. PECK, deceased, late a citizen of the United States, residing at Cambridge, in the county of Middlesex, State of Massachusetts, did invent new and useful Improvements in Optical Instrument, (Case D,) of which the following is a specification.

This invention relates to optical instruments, the object of the invention being to provide an optical instrument, the objective end of which is comparatively of very small diameter. This case is divided out of an application for patent on "optical instrument," Serial No. 127,084, and filed in the United States Patent Office on October 23, 1916.

The invention is particularly adapted to be used in connection with periscopes such as are used on submarines, but while the invention hereinafter described is particularly illustrated and described in connection with periscopes, I wish it to be distinctly understood that I do not limit the invention to periscopes, the same being applicable to other forms of opitical instruments. In periscopes it is understood that the portion of the periscope which extends above the water should be of as small diameter as possible in order that it may not be visible to the enemy.

The object of the invention is to obtain a clear view of a distant object through a very small slender tube or housing.

The object of the invention is further to provide a periscope which is small in diameter where it projects above the water and for a considerable distance below the water so that the same may be difficult of observation by the enemy, and also so that it may not make a perceptible wake in the water, for it is by the wake as well as by the part of the periscope extending above the surface of the water that the submarine is discovered by the enemy.

The invention primarily consists in a telescope objective and a telescope eye-piece with a housing therefor extending beyond the telescope objective, said extension comprising a plurality of tubes of varying interior diameters, the tube of least diameter being farthest removed from the telescope objective and preferably inclosing the nodal point of said telescope objective, said housing forming a means for snugly inclosing the rays of light from the objective viewed.

The invention consists in an optical instrument such as hereinafter set forth in the specification and particularly in the combination and arrangement of parts set forth in the claims.

In the following specification and in the claims I use the term "nodal point" to indicate that point where the rays from a distant object to the object glass of a telescope cross each other.

Referring to the drawings:

Figure 1 is a sectional elevation of an optical instrument embodying the invention.

Fig. 2 is a detail section taken on line 2—2 of Fig. 1.

Fig. 3 is a sectional elevation of the invention as adapted for a periscope, including means for raising and lowering the housing and its inclosed lenses.

Fig. 4 is a detail section taken on line 4—4 of Fig. 3.

Fig. 5 is a diagrammatic view of the convex objective lens and concave ocular of a Galilean telescope with lines indicating the angular field of view, and the "nodal point."

Fig. 6 is a diagrammatic view of the convex objective lens and convex eye-piece or ocular of an astronomical telescope with lines indicating the angular field of view and the "nodal point."

In the drawings, Figure 1 illustrates the invention in its simplest form, the same consisting of a telescope objective 10, a telescope eye-piece 11 and a housing 12 for said telescope objective and eye-piece. The housing 12 consists of a cylindrical portion 13 in which are inclosed the telescope objective and eye-piece. Said housing further consists of an extension of the cylindrical portion 13 which extends toward the nodal point of the telescope objective for a portion of the distance and another tubular extension 15 connects with the upper end of the cylindrical portion 13 and projects beyond the nodal point 14, terminating at its upper end in a small view channel opening 16, said opening being about three-sixteenths of an inch in diameter.

The "nodal point" is that point at which a ray of light extending directly from the top of the telescope objective to the bottom of the field of view of said objective crosses another ray of light extending from the bottom of said telescope objective to the top of the field of said objective, this point being situated on the principal axis of the telescope objective at a substantial distance from said objective.

The rays of light coming from the object viewed in a limited field are of very slight angular extension. Said rays are closely housed by the tubular extension 15 of the housing which provides a restricted channel for the light rays extending from the crossing point of said rays to the upper end of the cylindrical portion 13. A telescopic view of the object may thus be obtained through a very small top aperture.

A flange-like diaphragm 17 having a small round aperture 18 is located in the tubular extension 15 adjacent to the nodal point.

The form of the invention illustrated in Fig. 1 is of the simplest character to which the invention can be reduced, but when the same is used as a periscope it is desirable that the rays from the ocular should enter the eye from a horizontal position, while the rays as they pass through the periscope housing must pass in a vertical direction and, therefore, when the invention is embodied in a periscope, the same is preferably constructed as illustrated in Fig. 3, in which 10 is the telescope objective, 11 is the telescope eye-piece, 19 is a totally reflecting prism located intermediate the eye-piece and the telescope objective and adjacent to the eye-piece, 13 is the cylindrical portion of the housing in which the telescope objective is located, 15 is the tubular extension and 17 the diaphragm.

At the upper end of the tubular extension 15 is a totally reflecting prism 20. The prism 20 diverts the rays so that, those which cross at or near the nodal point 14 pass down the tubular extension 15 and down the cylindrical portion 13 of the housing to the telescope objective 10 and from the telescope objective 10 said rays pass to the totally reflecting prism 19 and are reflected by said prism through the telescope eye-piece 11, from whence they converge to the eye of the observer.

As illustrated in Fig. 3 the housing and its extension is inclosed within an exterior housing 21; the lower portion of said exterior housing is slidable in bearings 22 and 23 supported upon a stationary base 24. Said exterior housing has a piston 25 fast thereto which is movable vertically in a chamber 26 provided in the stationary base 24. A pipe 27 leads into the chamber 26 above the piston 25 and another pipe 28 leads into said chamber below the piston 25, so that by introducing the proper fluid under pressure through the pipe 27 the periscope housing and the lenses inclosed therein may be lowered. By introducing said fluid under pressure through the pipe 28 said periscope housing and its lenses may be moved upwardly. The liquid or whatever fluid may be used in the chamber 26 for raising and lowering the periscope housing passes inwardly through the pipe 27 and at the same time passes outwardly through the pipe 28 and vice versa, according to whether the periscope housing is being lowered or raised, respectively.

It will be seen that by the construction hereinbefore set forth a very slender tube may be used for that portion of the housing shaft which extends above the surface of the water and the object of using such a tube is to render the portion of the periscope top which projects above the water slender and as inconspicuous as possible in order to avoid discovery by the enemy.

It will be readily understood that the nodal point, as hereinbefore defined, is formed by the crossing of the rays extending from the top and bottom of the telescope objective to the bottom and top, respectively, of the field of said objective and may, in practice, extend over several inches longitudinally of the axis of the adjective on account of the very slight divergence of the rays from each other, and, therefore, said nodal point for a given diameter objective and given field is not limited to an exact geometrical point, but may be in practice at any point within several inches longitudinally of the principal axis of said objective.

In order that sufficient data may be set forth to enable one skilled in the art to find the nodal point, for an objective of given diameter and focus, two principal types of telescopes must be considered: first, the Dutch or Galilean telescope and second the astronomical telescope.

*First case, Galilean telescope.*

The lenses of this instrument in its simplest form consist, as illustrated in Fig. 5, of a convex objective lens 77 and a concave ocular 78, the rear focal point of the ocular being at or near the rear focal point of the objective as at P on the principal axis AP of the lenses where P is the rear focal point of both lenses.

The following formula may be used for determining the annular field of view; it is a standard formula:

$$\tan A' = \frac{1}{M} \times \frac{R + rM}{L + DM}$$

in which—

A'=half the angle of the angular field of view.

The following data is needed for the calculation of the angle A'.

R = the free radius of the objective.
F = the focal length of the objective.
$f$ = the focal length of the eye lens (the ocular).
L = the optical length of the telescope; this is practically F—$f$.
M = the magnification of the system; this is equal to $\frac{F}{f}$.
$r$ = the radius of the pupil of the eye usually taken as 0.2 centimeters (practically 1/13 inch).
D = the distance between the eye of the observer and the ocular of the telescope; it may be taken as 2 centimeters or say 3/4 of an inch.

Assuming that we have a Galilean telescope, therefore, in which the measurements are as follows:

$r$ = 1/13 of an inch.
R = 0.674 inch.
F = 18 inches.
$f$ = 3 inches.
M = $\frac{F}{f}$ = 6.
L = F—$f$ = 15 inches.
D = 3/4 inch, and substitute these dimensions in the formula hereinbefore set forth, we have $$\tan A' = \frac{1}{6} \times \frac{0.674 + (1/13 \times 6)}{15 + (3/4 \times 6)} = .0097$$

The corresponding angle is 33' 23" and the greatest angular field visible in the telescope is twice this or 1° 6' 46".

To obtain the "nodal point" N we have the simple trigonometrical relation of $$\tan A' = \frac{R}{X} \text{ or } X = \frac{R}{\tan A'} = \frac{0.674}{\tan 33' 23''} = \frac{0.674}{.0097} = 69.4 \text{ inches,}$$

and, therefore, the "nodal point" N lies 69.4 inches from the lens 77.

*Second case, astronomical telescope.*

The simplest astronomical telescope consists of a convex objective lens 79 and a convex eye piece or ocular 80, as illustrated in Fig. 6, the front focal point of the ocular being at or near the rear focal point of the objective as indicated in said figure at P.

In order to obtain a sharply defined border to the field of view it is customary to place a diaphragm E at the common focal point of the lenses. Then, if the radius of the hole in the diaphragm be denoted by $d$ the half angle of the field of view of the telescope is obtained by the formula $$\tan A' = \frac{d}{fM}$$

where M is the magnification = $\frac{F}{f}$, or this formula may be simplified considerably as follows: Knowing that the magnification M is the ratio of the focal lengths F and $f$ the formula may be written $$\tan A' = \frac{d}{fM} = \frac{d}{f \frac{F}{f}} = \frac{d}{F}$$

a very simple relation.

As an example of the application of this formula: Assuming F to be 12 inches and the stop radius $d$ = 0.1244 (practically 1/8 of an inch), then we obtain $$\tan A' = \frac{0.1244}{12} = 0.01037$$

which is the tangent of an angle of 35' 39". The whole angle of view of the telescope is, therefore, 1° 11' 18".

A calculation for the "nodal point" N then becomes as before for an instrument in which R = 0.674

$$\tan A' = \frac{R}{X} \text{ or } X = \frac{R}{\tan A'} = \frac{0.674}{0.01037} = 65 \text{ inches.}$$

Having thus described the invention, what I claim and desire by Letters Patent to secure is:

1. An optical instrument having, in combination, a telescope objective, a telescope eye-piece, a housing therefor, said housing extending beyond said telescope objective toward the nodal point of said objective, said extension comprising a plurality of tubes of different interior diameters and one of said tubes inclosing therein said nodal point, the tube of least diameter being that which is farthest removed from said objective.

2. An optical instrument having, in combination, a telescope objective, a telescope eye-piece, a housing therefor, said housing extending beyond said telescope objective toward the nodal point of said objective, said extension comprising a plurality of tubes of different interior diameters and one of said tubes inclosing therein said nodal point.

3. An optical instrument having, in combination, a telescope objective, a telescope eye-piece, a housing therefor, said housing extending beyond said telescope objective and beyond the nodal point of said objective, said extension comprising a plurality of tubes of different interior diameters, one of said tubes inclosing therein said nodal point.

4. An optical instrument having, in combination, a telescope objective, a telescope eye-piece, a housing therefor, said housing extending beyond said telescope objective toward the nodal point of said objective, said extension comprising a plurality of tubes of different interior diameters, one of said tubes inclosing therein said nodal point, the tube of least diameter being that which is farthest removed from said objective, and means to raise and lower said housing.

5. An optical instrument having, in combination, a telescope objective, a telescope eye-piece, a housing therefor, said housing extending beyond said telescope objective toward the nodal point of said objective, said extension comprising a plurality of tubes of different interior diameters, the tube of least diameter being that which is farthest removed from said objective, and a small apertured diaphragm centered about the principal axis of said telescope objective and located in one of said tubes adjacent to said nodal point.

6. An optical instrument having, in combination, a telescope objective, a telescope eye-piece, a housing therefor, said housing extending beyond said telescope objective toward the nodal point of said objective, said extension comprising a plurality of tubes of different interior diameters, one of said tubes inclosing therein said nodal point, the tube of least diameter being that which is farthest removed from said objective, and a totally reflecting prism located adjacent to said eye-piece and between said eye-piece and telescope objective.

7. An optical instrument having, in combination, a telescope objective, a telescope eye-piece, a housing therefor, said housing extending beyond said telescope objective toward the nodal point of said objective, said extension comprising a plurality of tubes of different interior diameters, one of said tubes inclosing therein said nodal point, the tube of least diameter being that which is farthest removed from said objective, a totally reflecting prism located at one end of said housing adjacent to said eye-piece and intermediate said eye-piece and objective and another totally reflecting prism located at the opposite end of said housing.

In testimony whereof I, ARTHUR K. PECK, executor of the estate of HARRY H. PECK, deceased, have hereunto set my hand in presence of two subscribing witnesses.

ARTHUR K. PECK,
*Executor of the estate of Harry H. Peck, deceased.*

Witnesses:
 DANIEL A. ROLLINS,
 CHARLES V. GOODING.

Copies of this patent may be obtained for five cents each, by addressing the "Commissioner of Patents, Washington, D. C."